June 9, 1925.  1,540,865
A. C. SALMONS
CHECKROW PLANTER
Filed May 9, 1922  2 Sheets-Sheet 2
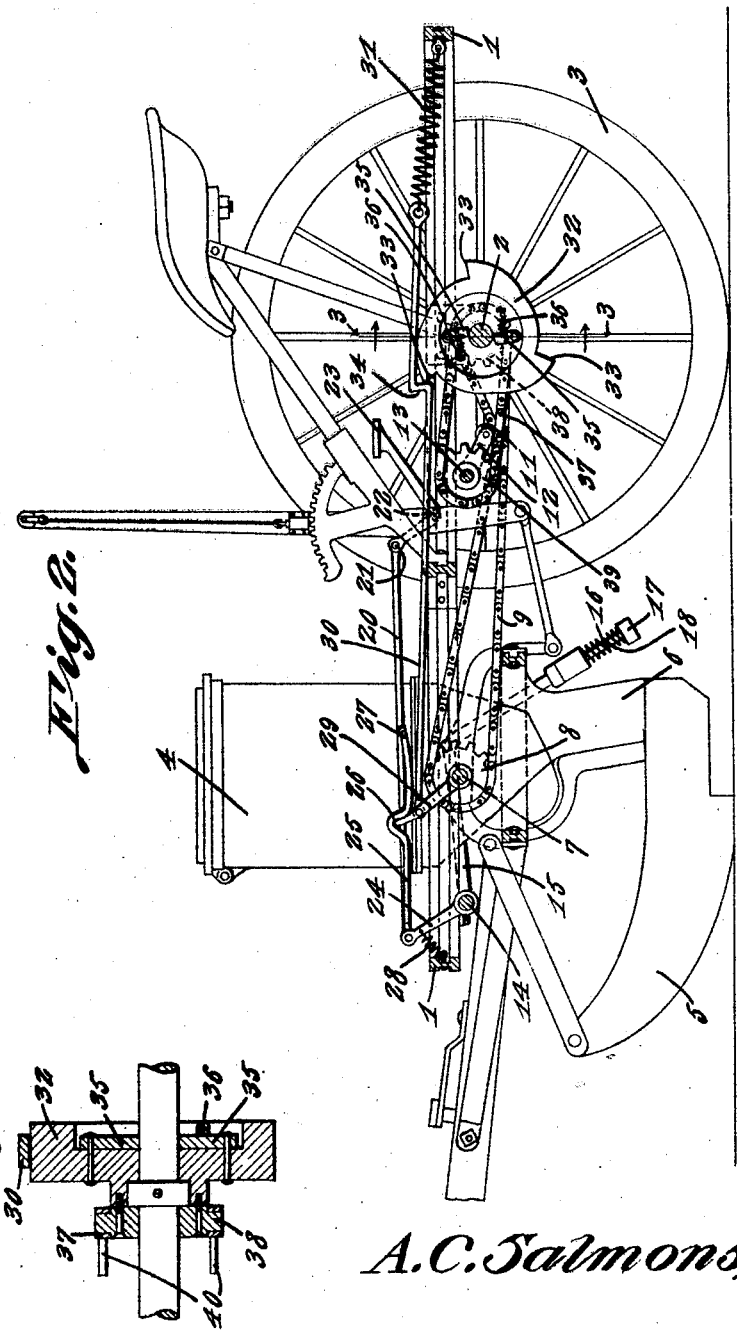
A. C. Salmons, Inventor
By C. A. Snow & Co.
Attorney Patented June 9, 1925.

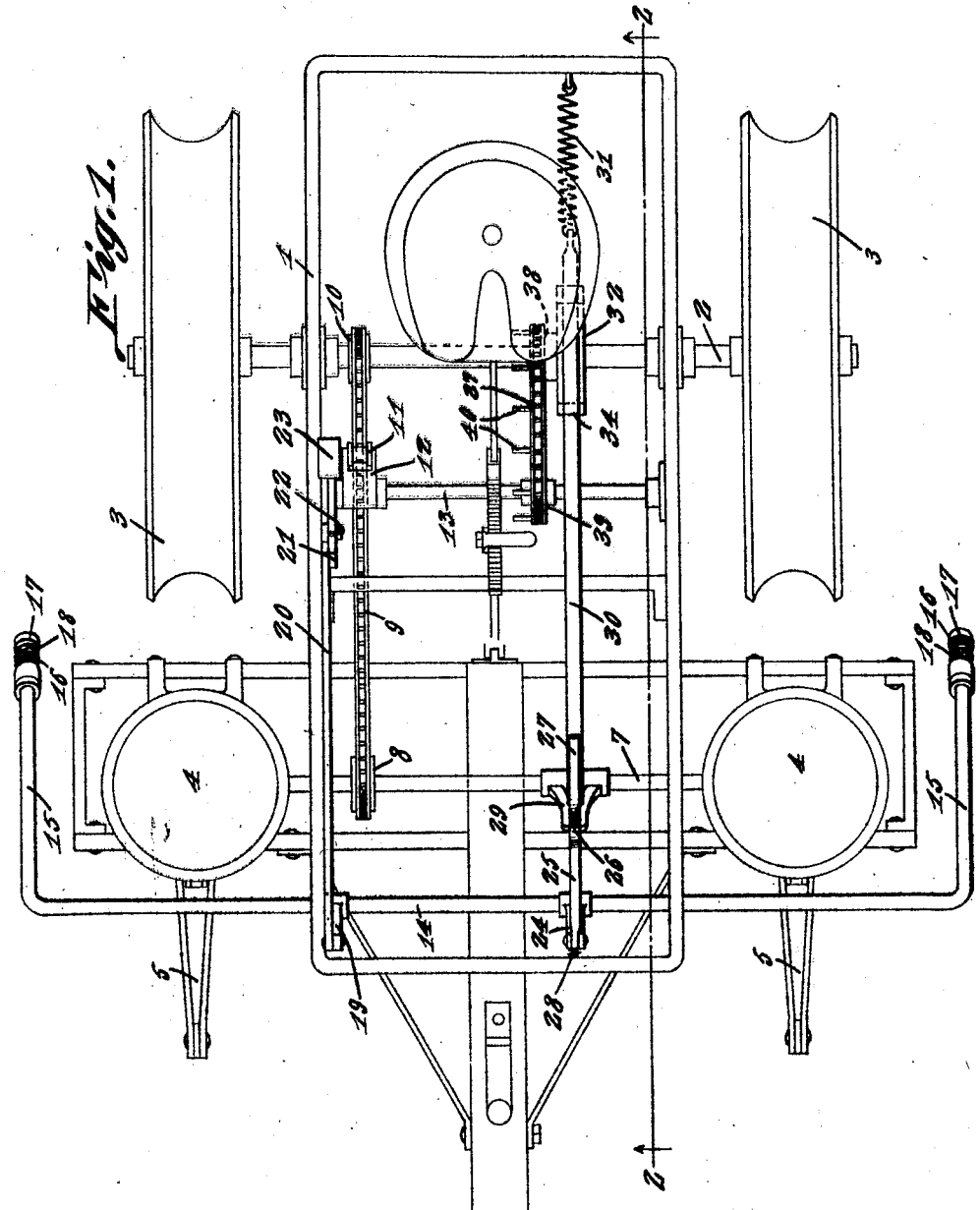

1,540,865

UNITED STATES PATENT OFFICE.

ALVA C. SALMONS, OF COSBY, MISSOURI.

CHECKROW PLANTER.

Application filed May 9, 1922. Serial No. 559,523.

*To all whom it may concern:*

Be it known that I, ALVA C. SALMONS, a citizen of the United States, residing at Cosby, in the county of Andrew and State of Missouri, have invented a new and useful Checkrow Planter, of which the following is a specification.

This invention relates to a planter and more particularly to a check row attachment adapted to be operated independently of a wire.

One of the objects of the invention is to provide markers having means controlled by the rotation of the supporting wheels of the planter, for successively elevating and releasing the markers, additional means being employed for forcing the released markers into contact with the ground.

A further object is to provide means whereby the marking attachment can be easily set at the beginning of each row.

A further object is to provide a marking mechanism which is simple, durable and compact and can be installed readily on a planter of ordinary construction.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings—

Figure 1 is a plan view of a planter having the present improvements combined therewith.

Figure 2 is a longitudinal section on the line 2—2, Figure 1.

Figure 3 is a section on line 3—3, Figure 2.

Referring to the figures by characters of reference 1 designates the frame of a planter mounted on a rotatable axle 2 adapted to be driven by supporting wheels 3. Seed hoppers 4 are mounted on the frame and arranged thereunder are the usual furrow openers 5 and boots 6. The transverse shaft 7 of the seed dropping mechanism extends into the hoppers 4 and transversely of the frame 1 and has secured to it a sprocket 8 receiving motion through a chain 9 from a sprocket 10 secured to the axle 2. This chain is preferably provided with a tightener in the form of an idler roller 11 bearing downwardly on the chain and journaled within an arm 12 mounted to swing freely on a transverse shaft 13.

Journaled within the front portion of the frame 1 is a transversely extending rock shaft 14 which projects laterally beyond the sides of the frame and terminates in downwardly and rearwardly extending arms 15. The rear portion of each arm is preferably disposed at an angle to the front portion thereof as shown particularly in Figure 2 and slidably mounted in the free end of each arm 15 is a stem 16 having a foot 17 at its lower end. A spring 18 is mounted on the stem and bears against the foot so as to hold said foot normally pressed away from the arm 15. It will be understood, however, that when the arm 15 is swung downwardly by the rotation of shaft 14 in one direction the foot 17 will be forced into contact with the surface of the ground so as to form a depression therein and at this time the spring 18 will yield so as to act as a cushion and prevent breakage of any of the parts.

For the purpose of operating the shaft 14 by the action of the driver, there is provided on said shaft an arm 19 to which is pivoted one end of a rod 20. This rod is extended rearwardly and attached to one arm of a bell crank 21 fulcrumed as at 22 on the frame 1. The other arm of the bell crank provides a pedal 23 which can be operated by the foot of the driver.

Another radial arm 24 is secured to the shaft 14 and pivotally connected to it is a tongue 25 having an intermediate depression or recess 26 in the lower face thereof while the free end of the tongue is preferably upturned as shown at 27. A spring 28, connecting arm 24 to the frame 1, serves to hold the arm normally swung forwardly and the arms 15 normally raised with the feet 17 out of contact with the ground.

An actuating finger 29 is mounted to swing on the shaft 7 and its free end normally contacts with the tongue 25 so as to support it. To this finger is pivotally attached one end of a rod 30 extending rearwardly within the frame 1 and attached to the rear portion of the frame preferably by means of a coiled spring 31. This rod extends over a cam 32 mounted on the axle 2 and formed with preferably three radial shoulders 33 each of which is adapted successively to engage a shoulder 34 formed by offsetting an intermediate portion of the rod 30. Cam 32 has dogs 35 pivotally mounted therein as shown in Figures 2 and 3, these dogs being held by springs 36 normally in engagement with the axle 2 so that when the axle is rotating during the forward movement of the machine it will, through frictional engagement with the dogs, cause the cam 32 to rotate in a counter-clockwise direction when viewed as in Figure 2. Thus during the rotation of the axle the cam will be moved therewith and the shoulders 33 brought successively against shoulder 34. Each shoulder 33 will thus shift the rod 30 forwardly against the action of spring 21 and will cause the finger 29 to swing under tongue 27 and finally become seated within the depression 26. Immediately subsequent to this action the shoulder 33 will move past and out of engagement with the shoulder 34 and the tensioned spring 31 will promptly pull rod 30 rearwardly. This will cause the finger 29 to swing rearwardly and to pull tongue 25 therewith. Accordingly shaft 14 will be rotated and the marking feet will be thrust against the surface of the soil. This action will only be momentary, however, because immediately thereafter the next shoulder 33 will engage shoulder 34 and thrust the rod 30 forwardly so that finger 29 will move under and lift the tongue 25 and again become seated in the depression 26. Obviously as soon as the finger 26 is swung rearwardly a predetermined distance it passes out of the depression 26 and the spring 28, which is much lighter than spring 31, will swing the arm 24 and rotate the shaft 14 back to their normal positions.

From the foregoing description it will be obvious that as the machine travels over a field the markers will be automatically set and released so as to mark the field at regular intervals, the rows of marks thus produced indicating the rows along which the seeds have been planted. The dropping of the seed is effected by the action of the shaft 7 which operates in properly timed relation with the marking mechanism.

When the machine reaches the end of a field and is turned around so as to start back over the field it is necessary to reset the marking mechanism so that the new series of marks will be in line with the marks already made. This is done by means of a chain 37 mounted on a sprocket 38 which is secured to and rotates with the cam 32. This chain is also mounted on another sprocket 39 carried by the shaft 13. Laterally extending pins 30 are carried by the chain 37 and the operator by thrusting against one or more of these pins can actuate the chain so as to rotate cam 32 until one of the shoulders 33 is brought against the shoulder 34 at such a time as to cause actuation of the marker at the point desired. The dogs 35 permit clockwise rotation of the cam 32 independently of the axle 2 during the adjustment of the cam to get the necessary relationship between the shoulders 33 and 34.

What is claimed is:—

In a planter, the combination with a rock shaft, an arm extending therefrom, a spring for holding the arm normally in one extreme position, and a tongue pivotally connected to the arm and having an intermediate recess, of a seed dropping mechanism including a shaft, a finger secured to and rotatable with said shaft and normally engaging the tongue, a rod pivotally connected to the finger and having an intermediate shoulder, a spring connected to the rod for holding it normally in one extreme position, a rotatable wheel supported axle, means revoluble therewith for intermittently engaging the shoulder to intermittently shift the rod and finger in one direction against the action of the spring to position the finger in the recess, thereby coupling the tongue to the rod during the movement of the rod to normal position when released from the actuating means.

In testimony that I claim the foregoing as my own, I have hereto affixed my signature in the presence of two witnesses.

ALVA C. SALMONS.

Witnesses:
P. E. NEWBURN,
MAUDIE B MADDOCK.